United States Patent
Hks et al.

(10) Patent No.: US 9,612,907 B2
(45) Date of Patent: Apr. 4, 2017

(54) POWER EFFICIENT DISTRIBUTION AND EXECUTION OF TASKS UPON HARDWARE FAULT WITH MULTIPLE PROCESSORS

(71) Applicants: Chandan Hks, Bangalore Karnataka (IN); Sonika P Reddy, Marathalli Bangalore (IN)

(72) Inventors: Chandan Hks, Bangalore Karnataka (IN); Sonika P Reddy, Marathalli Bangalore (IN)

(73) Assignee: Unisys Corporation, Blue Bell, PA (US)

( * ) Notice: Subject to any disclaimer, the term of this patent is extended or adjusted under 35 U.S.C. 154(b) by 145 days.

(21) Appl. No.: 14/542,724

(22) Filed: Nov. 17, 2014

(65) Prior Publication Data

US 2015/0242275 A1    Aug. 27, 2015

(51) Int. Cl.
*G06F 11/14* (2006.01)
*G06F 9/48* (2006.01)

(52) U.S. Cl.
CPC ............ *G06F 11/14* (2013.01); *G06F 9/4881* (2013.01); *G06F 11/1479* (2013.01)

(58) Field of Classification Search
USPC .................................. 714/11; 718/103, 107
See application file for complete search history.

(56) References Cited

U.S. PATENT DOCUMENTS

| | | | | |
|---|---|---|---|---|
| 6,385,638 B1* | 5/2002 | Baker-Harvey | ...... | G06F 9/4881 718/102 |
| 8,473,818 B2* | 6/2013 | Mangione-Smith | | G06F 13/4022 714/776 |
| 2002/0023117 A1* | 2/2002 | Bernardin | ............... | G06F 9/465 718/104 |
| 2006/0101465 A1* | 5/2006 | Kato | .................. | G05B 19/0421 718/100 |
| 2008/0040171 A1* | 2/2008 | Albers | .................. | G06F 9/4887 705/7.37 |
| 2008/0148273 A1* | 6/2008 | Huang | .................. | G06F 9/4887 718/104 |
| 2010/0192115 A1* | 7/2010 | Yang | .................... | G06F 17/5022 716/104 |
| 2014/0351819 A1* | 11/2014 | Shah | ..................... | G06F 9/4887 718/103 |
| 2015/0378782 A1* | 12/2015 | Hks | ........................ | G06F 9/4837 718/103 |

OTHER PUBLICATIONS

Global Reliability-Aware Power Management for Multiprocessor Real-Time Systems, Xuan Qi, Dakai Zhu, Hakan Aydin, 2010, The Sixteenth IEEE International Conference on Embedded and Real-Time Computing Systems and Applications.*

* cited by examiner

Primary Examiner — Kamini Patel
(74) Attorney, Agent, or Firm — Robert P. Marley

(57) ABSTRACT

Tasks may be scheduled on more than one processor to allow the processors to operate at lower processor frequencies and processor supply voltages. Multiple processors executing tasks in parallel at lower frequencies and supply voltages may allow completion of the tasks by deadlines at lower power consumption than a single processor executing all tasks at high frequencies and supply voltages. Power efficiency of a computer system may be improved by using a combination of processors executing tasks using a combination of earliest deadline first (EDF), earliest deadline last (EDL), and round robin (RR) queue management methods.

24 Claims, 17 Drawing Sheets

500

Algorithm 2: Schedule the non real-time tasks on P3

Using the RR scheduling algorithm, schedule all the non real time tasks on P3 at the threshold frequency.

FIGURE 5

POWER EFFICIENT DISTRIBUTION AND EXECUTION OF TASKS UPON HARDWARE FAULT WITH MULTIPLE PROCESSORS

FIELD OF THE DISCLOSURE

The instant disclosure relates to power management. More specifically, this disclosure relates to power management in computer systems.

BACKGROUND

As computer processors have evolved over time they have gained the capability to execute more tasks by multitasking and the capability to execute tasks faster by operating at higher clock frequencies. However, as the processors have developed additional processing power, their power consumption has also risen. For example, a processor's power consumption may be proportional to the clock speed at which the processor operates. Thus, when the processor operates at higher clock speeds to execute tasks faster, the processor consumes more power than when the processor is operating at a lower clock speed. Power consumption may be a particular problem in a computer datacenter where hundreds or thousands of computers are located, such as a computer datacenter for providing cloud services to remote computers.

One conventional solution for reducing power consumption is dynamic voltage scaling (DVS), which reduces an operating frequency and/or operating power supply voltage for the processor when demand on the processor to execute tasks is low. Although this conventional technique may reduce power consumption of the processor, it does so at the risk of not completing tasks assigned to the processor by the tasks' deadlines. That is, this technique is generally agnostic to the priority of the task.

Another conventional solution is reliability aware power management (RAPM), which schedules tasks to maintain original reliability. Original reliability may be defined as the probability of completing all tasks successfully when executed at the processor's maximum frequency. In RAPM, jobs are scheduled on a processor running at a scaled down frequency and a corresponding recovery job is scheduled. When the first job completes, an acceptance test is performed. If the job completed successfully, then the recovery job is cancelled. Otherwise, the recovery job is executed on the processor at a maximum frequency. However, in the event that the first job failed, the recovery job may not complete before the deadline. Thus, processors executing according to the RAPM technique may not handle jobs with a utilization factor of more than 50%.

SUMMARY

In processors based on complimentary metal-oxide-semiconductor (CMOS) technology, the power consumption may be dominated by dynamic power dissipation, $p_d$, where $$p_d = C_{eff} V_{dd}^2 f,$$

where $V_{dd}$ is the processor supply voltage, $C_{eff}$ is the effective switching capacitance of the processor, and f is the processor frequency. The energy consumption may then be computed as $$E = p_d t,$$

where t is the task execution duration.

For example, consider a task that requires 20 time unites to execute at maximum frequency, $f_{max}$. The same task may be executed by reducing the processor frequency, f, and processor supply voltage, $V_{dd}$, by half in 40 time units. The power consumed to complete the task in 40 time units, $p_d'$, compared to 20 time units is $$p_d' = \frac{1}{8} p_d.$$

An increase in completion time by 2× results in a decrease in power consumption by 8×. That is, when the processor frequency, f, and processor supply voltage, $V_{dd}$, are reduced, the power consumed by the processor reduced cubically, and energy quadratically, at the expense of linearly increasing the task's execution time.

Tasks may be scheduled on more than one processor to allow the processors to operate at lower processor frequencies and processor supply voltages. Multiple processors executing tasks in parallel at lower frequencies and supply voltages may allow completion of the tasks by deadlines at lower power consumption than a single processor executing all tasks at high frequencies and supply voltages.

In one embodiment described below, tasks may be scheduled on two groups of processors by categorizing the tasks as realtime tasks and non-realtime tasks. These tasks may then be executed on two groups of processors with different task scheduling algorithms designed to achieve power efficiency for those categorized tasks.

According to one embodiment, a method may include distributing realtime processing tasks to a first group of processors including at least a first processor and a second processor. The first processor may execute tasks based on an earliest deadline first priority, and the second processor may execute tasks based on an earliest deadline last priority. The method may also include distributing non-realtime processing tasks to a second group of processors including at least a third processor.

According to another embodiment, a computer program product may include a non-transitory computer readable medium having code to perform the steps of distributing realtime processing tasks to a first group of processors including at least a first processor and a second processor, wherein the first processor executes tasks based on an earliest deadline first priority, and wherein the second processor executes tasks based on an earliest deadline last priority; and distributing non-realtime processing tasks to a second group of processors including at least a third processor.

According to yet another embodiment, an apparatus may include a memory, a first group of processors coupled to the memory, and a second group of processors coupled to the memory. The apparatus may be configured to perform the step of distributing realtime processing tasks to the first group of processors including at least a first processor and a second processor, wherein the first processor may execute tasks based on an earliest deadline first priority, and wherein the second processor may execute tasks based on an earliest deadline last priority. The apparatus may also be configured to perform the step of distributing non-realtime processing tasks to the second group of processors including at least a third processor.

According to a further embodiment, a method may include detecting, by a processor, at least one processor, scheduled to execute portions of a queue of realtime tasks and a queue of non-realtime tasks, has failed of a group of processors spanning at least two platforms coupled by a network; determining, by the processor, whether the failed processor of the group of processors is local to the processor or whether the failed processor of the group of processors is coupled through a network to the processor; and performing, by the processor, a course of action for performing tasks assigned to the failed process based, at least in part, on whether the failed processor is a local processor or a cloud processor.

According to another embodiment, a computer program product may include a non-transitory computer readable medium comprising code to perform the steps of detecting, by a processor, at least one processor, scheduled to execute portions of a queue of realtime tasks and a queue of non-realtime tasks, has failed of a group of processors spanning at least two platforms coupled by a network; determining, by the processor, whether the failed processor of the group of processors is local to the processor or whether the failed processor of the group of processors is coupled through a network to the processor; and performing, by the processor, a course of action for performing tasks assigned to the failed process based, at least in part, on whether the failed processor is a local processor or a cloud processor.

According to yet another embodiment, an apparatus may include a memory and a processor coupled to the memory. The processor may be configured to perform the steps of detecting, by the processor, at least one processor, scheduled to execute portions of a queue of realtime tasks and a queue of non-realtime tasks, has failed of a group of processors spanning at least two platforms coupled by a network; determining, by the processor, whether the failed processor of the group of processors is local to the processor or whether the failed processor of the group of processors is coupled through a network to the processor; and performing, by the processor, a course of action for performing tasks assigned to the failed process based, at least in part, on whether the failed processor is a local processor or a cloud processor.

According to one embodiment, a method may include receiving a new task with an earlier deadline than an executing task; determining whether an idle processor is available; and when an idle processor is available, executing the new task on the idle processor.

According to another embodiment, a computer program product may include a non-transitory computer readable medium comprising code to perform the steps of receiving a new task with an earlier deadline than an executing task; determining whether an idle processor is available; and when an idle processor is available, executing the new task on the idle processor.

According to yet another embodiment, an apparatus may include a memory and a processor coupled to the memory. The processor may be configured to perform the steps of receiving a new task with an earlier deadline than an executing task; determining whether an idle processor is available; and when an idle processor is available, executing the new task on the idle processor.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

FIG. 5 is an algorithm for executing non-realtime tasks within a group of processors according to one embodiment of the disclosure.

DETAILED DESCRIPTION

Figure 1A:
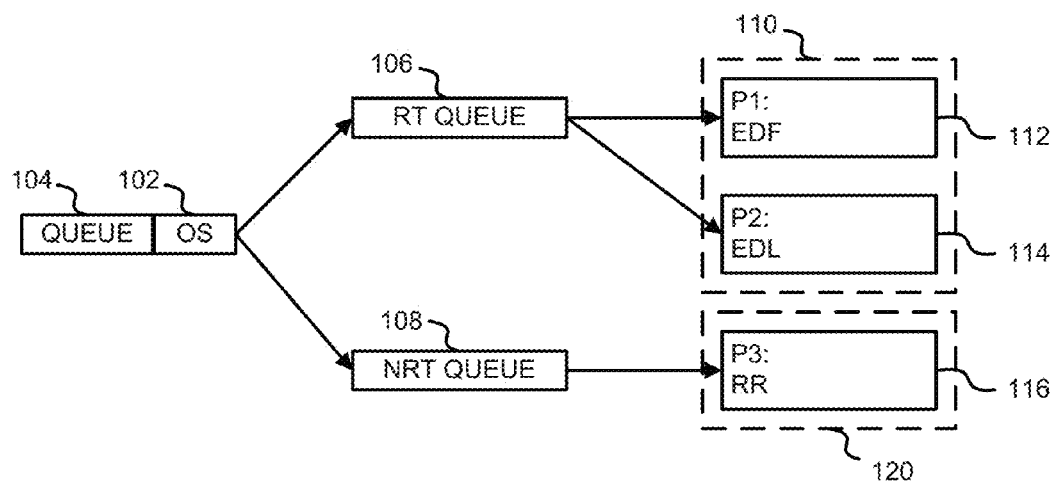
FIG. 1A is a block diagram illustrating a computer system with an arrangement of processors for executing tasks according to one embodiment of the disclosure.

Power efficiency of a computer system may be improved by using a combination of processors executing tasks using a combination of earliest deadline first (EDF), earliest deadline last (EDL), and round robin (RR) queue management methods. FIG. 1A is a block diagram illustrating a computer system with an arrangement of processors for executing tasks according to one embodiment of the disclosure. A system 100 may include an operating system 102 receiving tasks from a plurality of applications (not shown) executing in the operating system 102. The operating system queues the tasks in a queue 104. The operating system 102 may then categorize tasks from the queue 104 into a realtime task queue 106 and a non-realtime task queue 108. From the realtime task queue 106, the operating system 102 may distribute tasks to a first group of processors 110, including a first processor 112 and a second processor 114, for execution. From the non-realtime task queue 108, the operating system 102 may distribute tasks to a second group of processors 120, including at least a third processor 116, for execution. Although groups of processors are described, a group may include a single processor. Further, although processors are described, the processors may be physically separate processors or virtual processors operating from one physical processor. For example, the first and second processors may be different cores of the same processor or virtualized processors of the same core.

The first processor 112 and the second processor 114 may be configured to execute received tasks based on an earliest deadline first (EDF) prioritization and an earliest deadline last (EDL) prioritization, respectively. In one embodiment when the operating system 102 distributes a task to the first group of processors, the task may be assigned to the first processor 112 and a backup task corresponding to the task assigned to the second processor 114.

The third processor 116 may be configured to execute received tasks based on a round robin (RR) queue. For example, the third processor 116 may execute a first task from the non-realtime task queue 108 for a predetermined duration of time, then switch contexts from the first task to a second task from the non-realtime task queue 108. The third processor 116 may execute the second task for the predetermined duration of time, then switch contexts from the second task to another task in the non-realtime task queue 108 or return to the first task for the predetermined duration of time. As tasks in the non-realtime task queue 108 are completed by the third processor 116, the completed tasks may be removed from the non-realtime task queue 108 and results returned to the operating system 102.

Figure 1B:
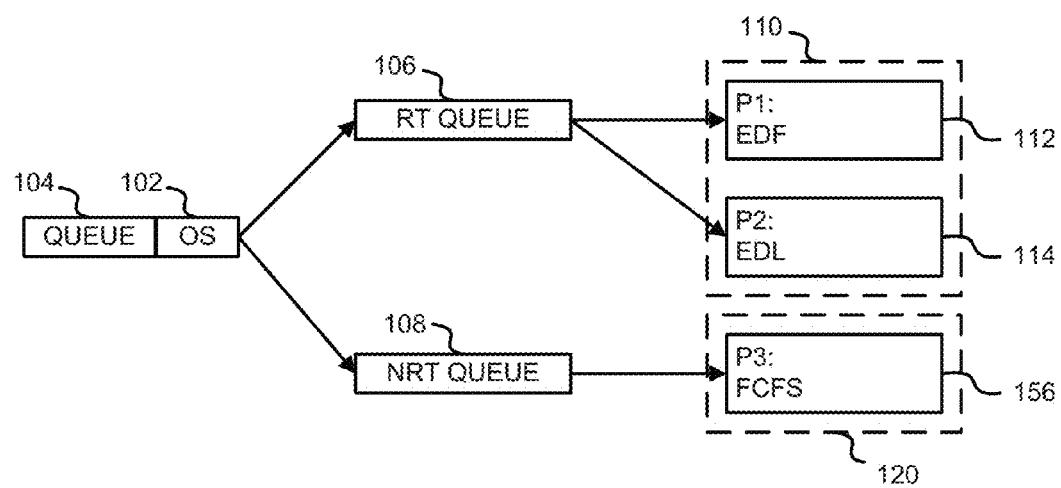
FIG. 1B is a block diagram illustrating a computer system with an arrangement of processors for executing tasks according to another embodiment of the disclosure.

In another embodiment, the third processor 116 may be configured to execute received tasks based on a first come first serve (FCFS) queue. FIG. 1B is a block diagram illustrating a computer system with an arrangement of processors for executing tasks according to another embodiment of the disclosure. A third processor 156 may execute tasks from the non-realtime (NRT) queue 108 according to a first come first serve (FCFS) algorithm. In some embodiments, such as when the processors are part of a cloud computing system, the processor 156 may not be assigned to the non-realtime (NRT) queue 108 until tasks are scheduled in the queue 108.

Figure 2:
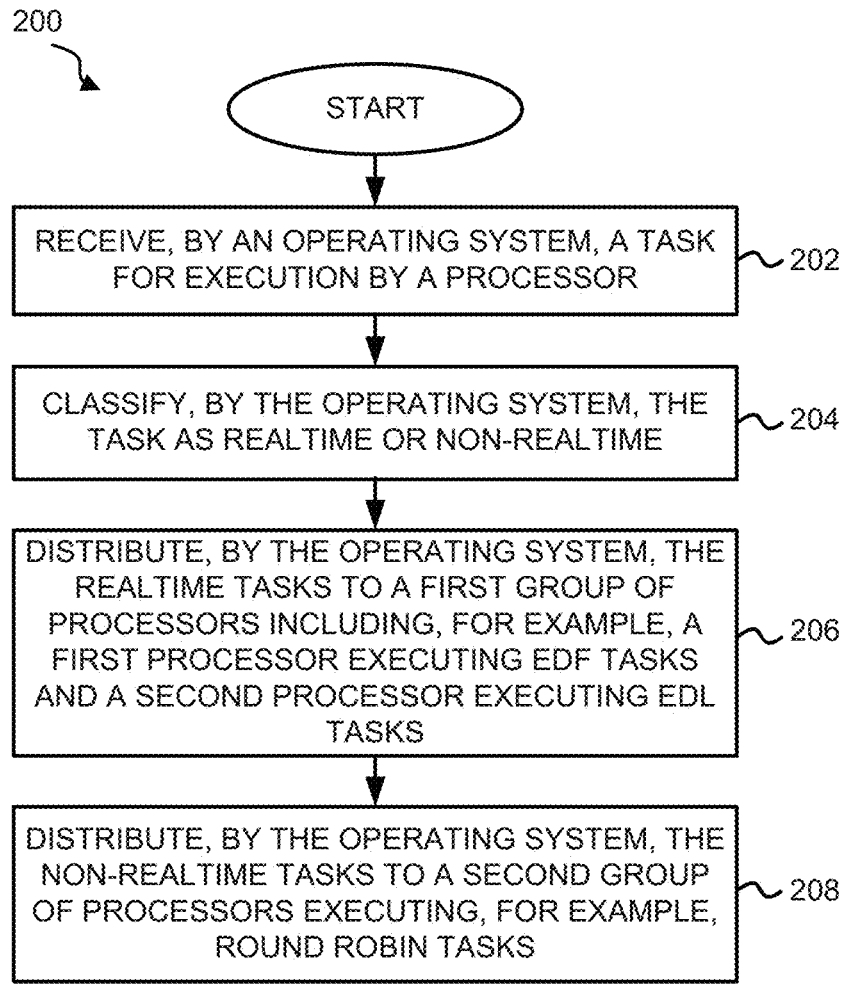
FIG. 2 is a flow chart illustrating a method for distributing tasks to processors in a computer system according to one embodiment of the disclosure.

A method for executing tasks within the computer system illustrated in FIG. 1 is described with reference to FIG. 2. FIG. 2 is a flow chart illustrating a method for distributing tasks to processors in a computer system according to one embodiment of the disclosure. A method 200 begins at block 202 with receiving, by an operating system, a task for execution by a processor. Then, at block 204, the operating system classifies the task as either a realtime task or a non-realtime task. At block 206, realtime tasks may be distributed to a first group of processors. The first group of processors may include a first processor executing tasks based on an earliest deadline first (EDF) priority scheme. The first group of processors may also include a second processor executing tasks based on an earliest deadline last (EDL) priority scheme. When a realtime task is distributed to the first group of processors, a first task may be queued on the first processor and a corresponding back-up task may be queued on the second processor. At block 208, non-realtime tasks may be distributed to a third processor executing tasks based on a round robin (RR) priority queue.

Figure 3:
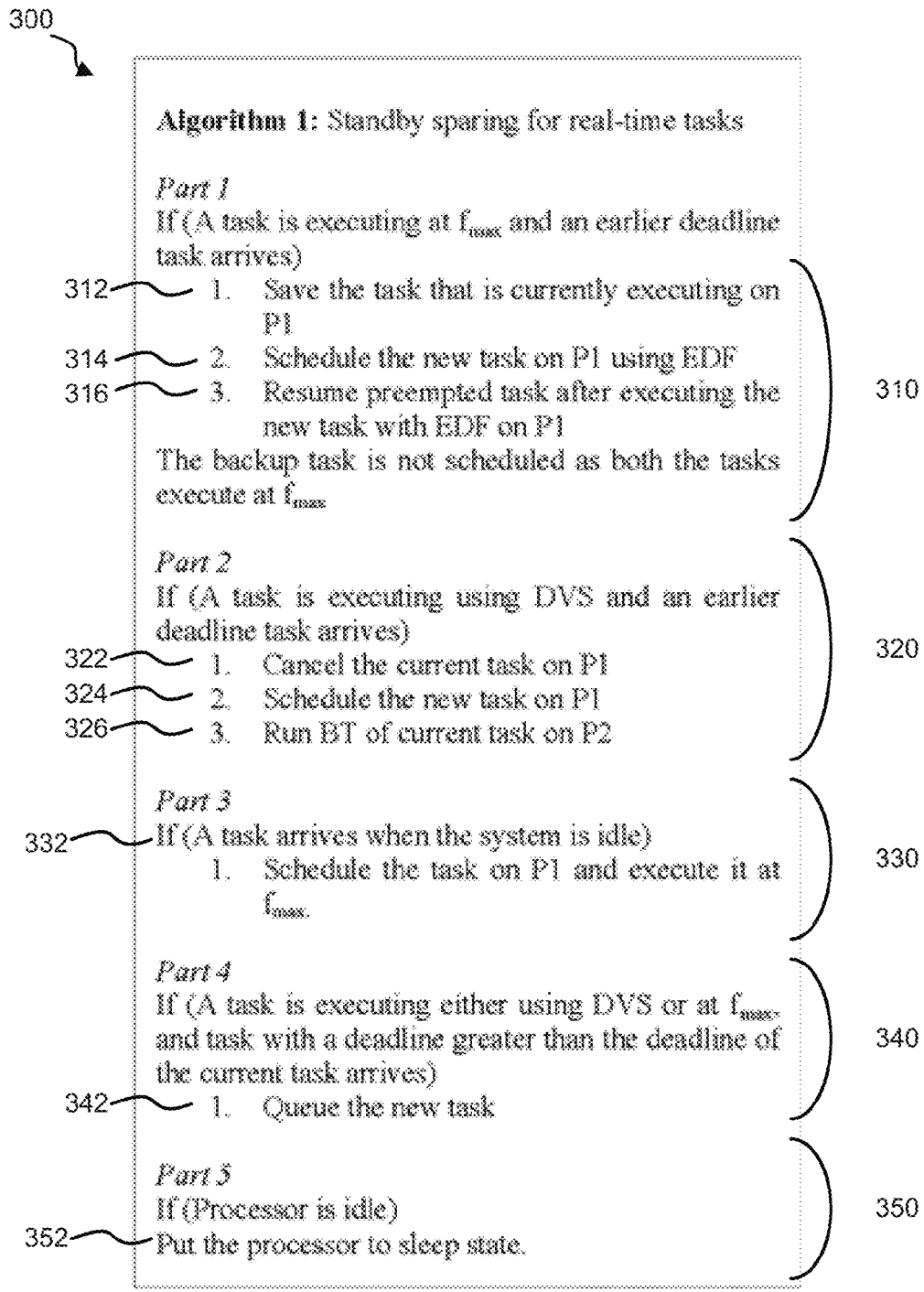
FIG. 3 is an algorithm for executing realtime tasks within a group of processors according to one embodiment of the disclosure.

An algorithm for executing tasks within the first group of processors is illustrated in the algorithm of FIG. 3. FIG. 3 is an algorithm for executing realtime tasks within a group of processors according to one embodiment of the disclosure. An algorithm 300 may control a group of processors executing realtime tasks based on a state of the group of processors. A first sub-algorithm 310 applies when the first group of processors receives an earlier deadline task than a task already executing on the first group of processors and when a processor of the first group of processors is executing at maximum frequency. The sub-algorithm 310 begins at step 312 with saving an existing task on the first processor. Then, at step 314, the new task, having an earlier deadline than the existing task, may be scheduled on the first processor. Switching from the existing task to the new task may involve a context switch for the first processor from the existing task to the new task. Then, at step 316, the preempted existing task is resumed by the first processor after completing execution of the new task of step 312. Because both the new task and the existing task are executing at a maximum frequency of the first processor, no backup task may be scheduled on the second processor for the new task.

A second sub-algorithm 320 of FIG. 3 applies when a task is executing on the first group of processors using dynamic voltage scaling (DVS) and a new task arrives with an earlier deadline than an existing task. The sub-algorithm 320 begins at step 322 with cancelling the existing task executing on the first processor and scheduling the new task for execution on the first processor at step 324. Then, at step 326, a backup task for the existing task may be executed on the second processor. In one embodiment, when a task is executing and a new task comes into the system with an earlier deadline, the new task may be executed at maximum frequency.

Figure 4:
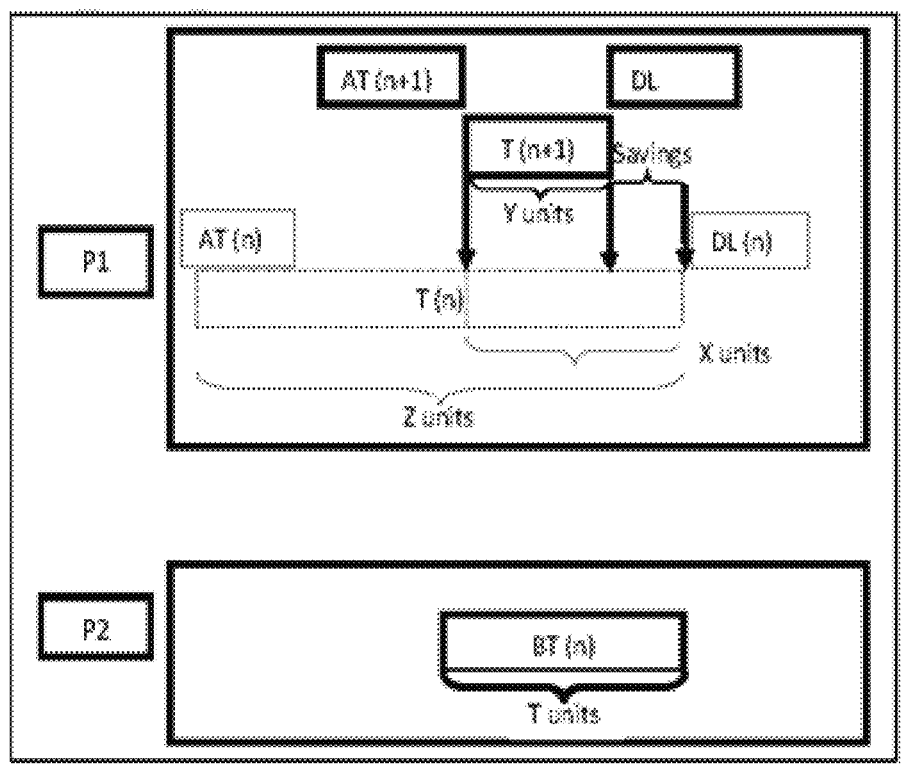
FIG. 4 is a timeline illustrating execution of tasks on two processors according to one embodiment of the disclosure.

Execution of the second sub-algorithm may allow improved power efficiency compared to conventional techniques for distributing and executing tasks. The savings may be illustrated by mapping execution of the tasks on the processors as shown in FIG. 4. FIG. 4 is a timeline illustrating execution of tasks on two processors according to one embodiment of the disclosure. A task T (n) may be executing with dynamic voltage scaling (DVS) on a first processor when a new task T (n+1) arrives with a deadline earlier than task T (n). T (n) may consume T units of time to execute at a maximum frequency of the first processor and Z units of time to execute with dynamic voltage scaling (DVS). In one embodiment, when a task is executing and a new task comes into the system with an earlier deadline, the new task may be executed at maximum frequency.

At (Z-X) units of time, T (n+1) arrives with an earlier deadline than T (n) and will take priority over the first processor. Task T (n+1) then executes for Y units to time (Z-X+Y) units. Conventionally, task T (n) would then resume execution on the first processor. However, when T (n+1) took priority over the first processor from task T (n), the backup task BT (n) may be queued and/or begin executing on the second processor. The backup task BT (n) then executes for T units on the second processor. Because the task BT (n) was executed on the second processor, the first processor does not resume execution of task T (n). Thus, the first processor has a time period corresponding to the savings from (Z-X+Y) time units to Z time units. During this savings period, the first processor may begin execution of another task and/or switch to a power-savings idle mode.

Referring back to FIG. 3, a third sub-algorithm 330 of FIG. 3 applies when a task arrives and the first group of processors is idle. When the sub-algorithm 330 executes, a step 332 includes scheduling the task for execution and/or executing the task on the first processor at a maximum frequency.

A fourth sub-algorithm 340 of FIG. 3 applies when an existing task is executing either a maximum frequency or with dynamic voltage scaling (DVS) and the new task has a deadline greater than the deadline of the existing task. When the sub-algorithm 340 executes, a step 342 includes queuing the new task for execution by the first processor after completion of the existing task.

A fifth sub-algorithm 350 of FIG. 3 applies when the processor idles, such as when the realtime queue is empty. When the sub-algorithm 350 executes, a step 352 puts the first group of processors into a sleep state.

An algorithm for executing tasks on a second group of processors is illustrated in the algorithm of FIG. 5. FIG. 5 is an algorithm for executing non-realtime tasks within a group of processors according to one embodiment of the disclosure. An algorithm 500 may control execution of tasks on a second group of processors, including at least a third processor. For example, the algorithm 500 may include using a round robin (RR) scheduling algorithm to schedule all non-realtime tasks on the second group of processors at a threshold frequency.

Figure 6:
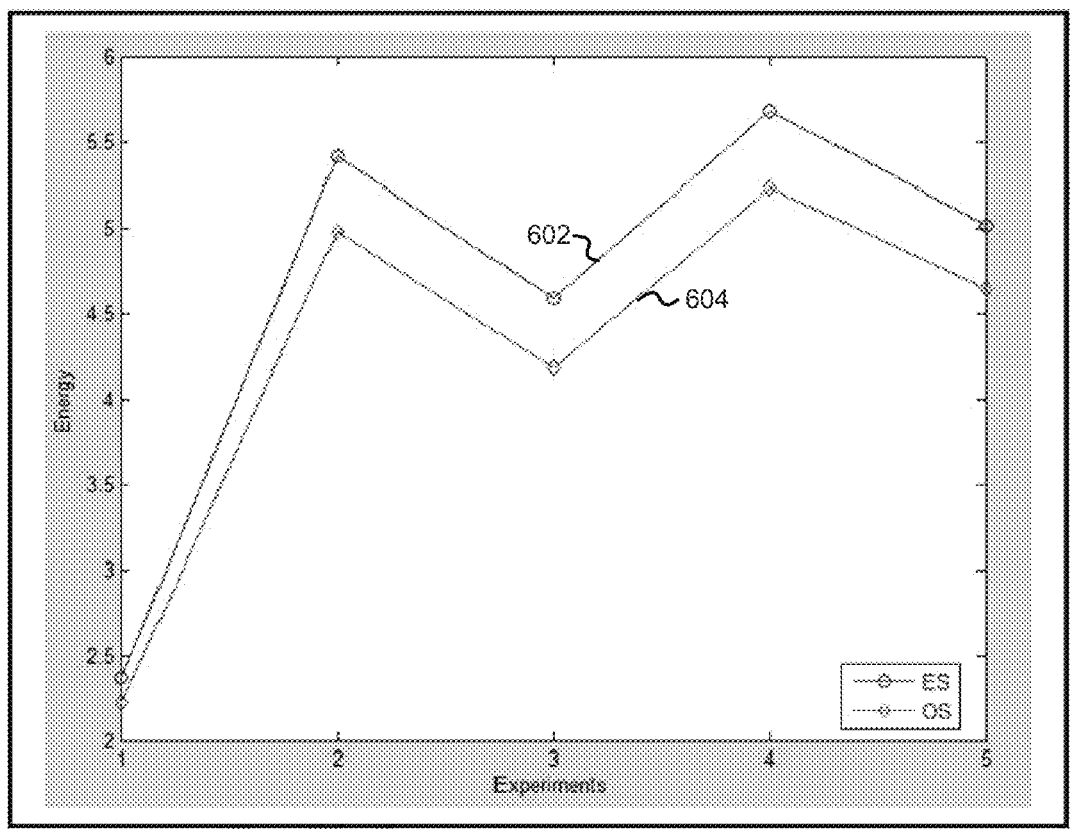
FIG. 6 is a graph illustrating power consumption of a conventional computer system and a computer system executing the algorithms described herein for realtime tasks according to one embodiment of the disclosure

The algorithms above may increase power efficiency of the computer system. For example, FIG. 6 is a graph illustrating power consumption of a conventional computer system and a computer system executing the algorithms described herein for realtime tasks according to one embodiment of the disclosure. A line 604 for power consumption during realtime task execution of a computer system according to one embodiment described above shows approximately a 8.5% decrease in power consumption over a conventional computer system shown at line 602.

Figure 7:
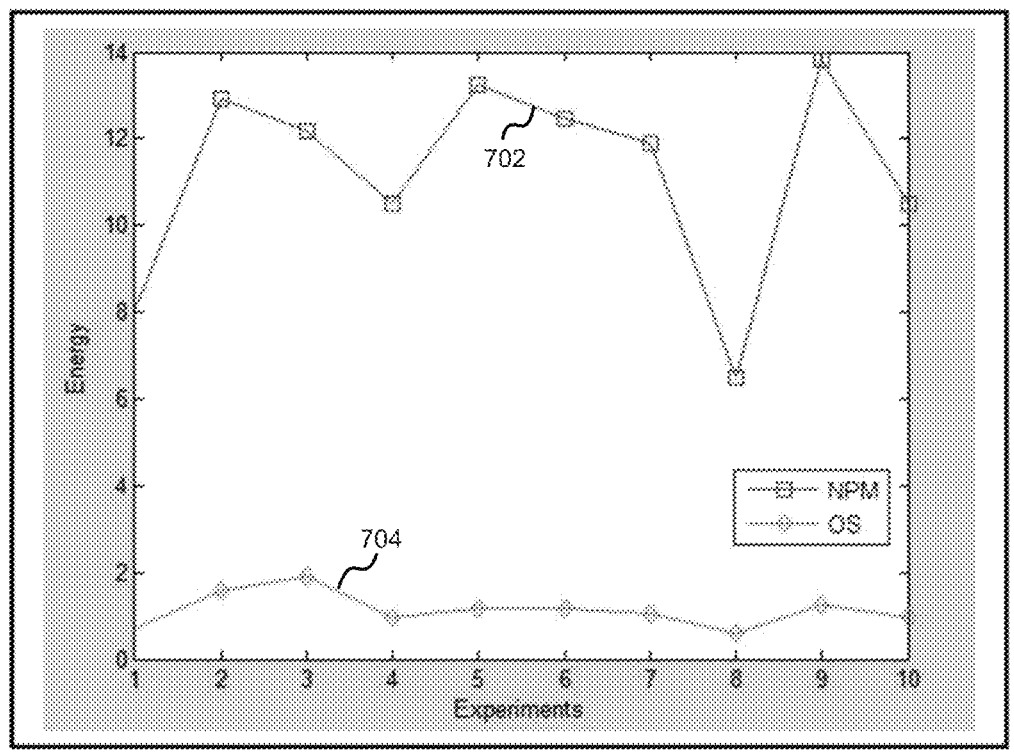
FIG. 7 is a graph illustrating power consumption of a conventional computer system and a computer system executing the algorithms described herein for non-realtime tasks according to one embodiment of the disclosure.

FIG. 7 is a graph illustrating power consumption of a conventional computer system and a computer system executing the algorithms described herein for non-realtime tasks according to one embodiment of the disclosure. A line 704 for power consumption during non-realtime task execution of a computer system according to one embodiment described above shows up to approximately a 85% decrease in power consumption over a conventional computer system shown as line 702.

Figure 8:
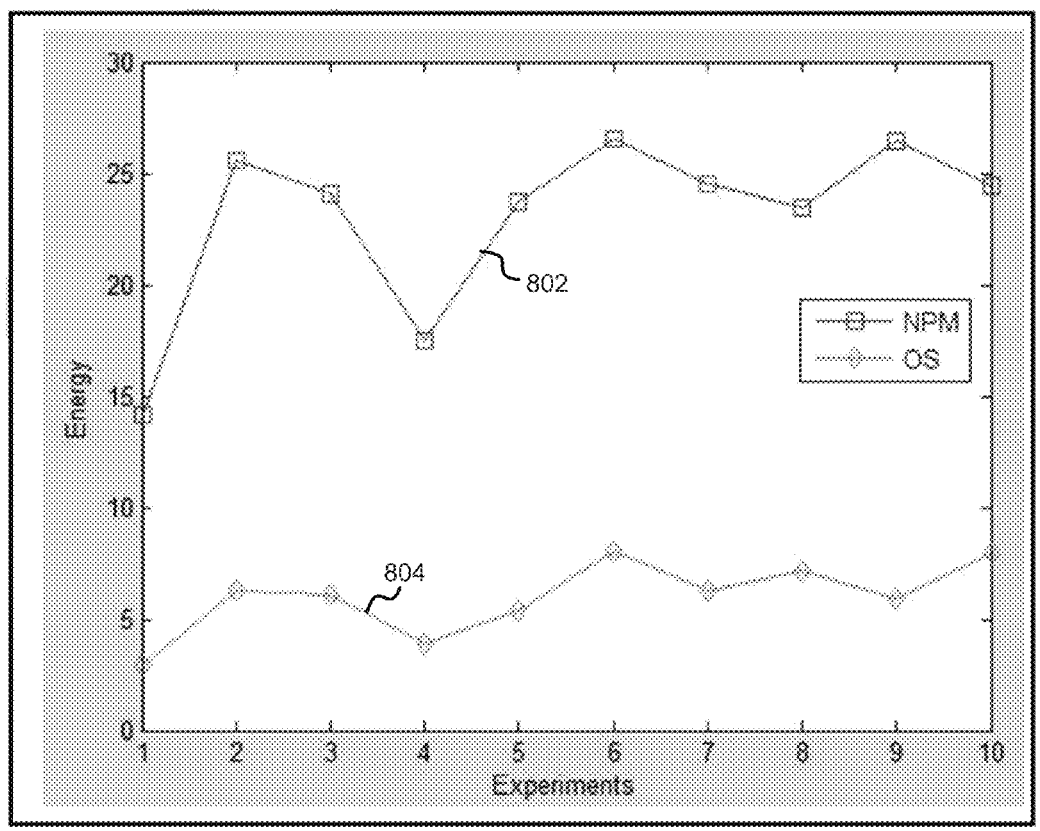
FIG. 8 is a graph illustrating power consumption of a conventional computer system and a computer system executing the algorithms described herein for realtime and non-realtime tasks according to one embodiment of the disclosure.

FIG. 8 is a graph illustrating power consumption of a conventional computer system and a computer system executing the algorithms described herein for realtime and non-realtime tasks according to one embodiment of the disclosure. A line 804 for power consumption during execution of all tasks in a computer system according to one embodiment described above shows approximately a 62% decrease in power consumption over a conventional computer system shown at line 802.

The operation of processors according to the algorithms described above may decrease power consumption within a computer system. The savings may be multiplied in cloud datacenters where hundreds or thousands of computer systems may be located.

Applications and tasks may be executed on a group of processors according to the algorithms described above. For example, the group of processors may be interconnected through a cloud and located at different physical locations. When a group of processors are executing tasks, processors within the group may fail or become disconnected. For example, power may be lost at one location. Then, applications and tasks should be reassigned to other processors in the group. One algorithm for tolerating hardware faults within the group of processors is described below with reference to FIG. 9A and FIG. 9B.

Figure 9A:
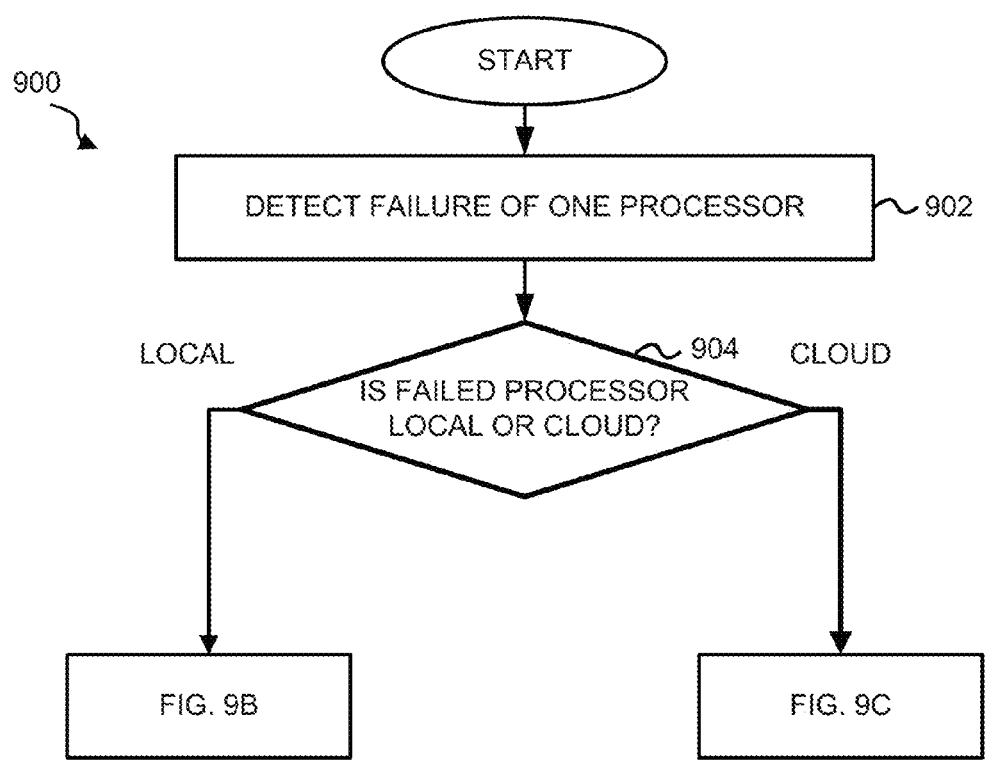
FIG. 9A is a flow chart illustrating a method for tolerating a single processor hardware fault according to one embodiment of the disclosure.

FIG. 9A is a flow chart illustrating a method for tolerating a single processor hardware fault according to one embodiment of the disclosure. A method 900 begins at block 902 with detecting the failure of one processor of a group of processor. At block 904, it is determined whether the failed processor is local or in the cloud. When the processor is local, the method 900 may continue with the method described with reference to FIG. 9B. When the failed processor is a cloud processor, the method 900 may continue with the method described with reference to FIG. 9C.

Figure 9B:
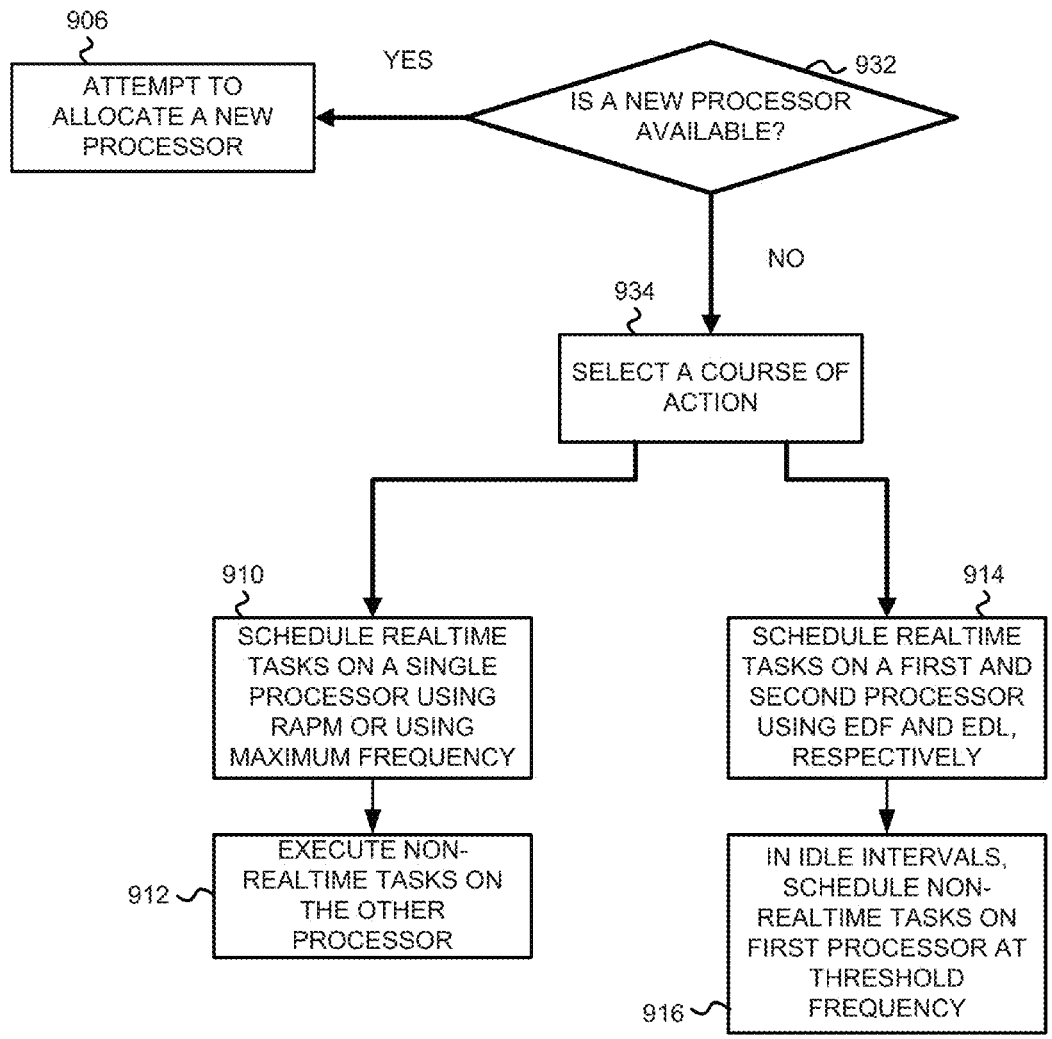
FIG. 9B is a flow chart illustrating a method for tolerating a single local-based processor hardware fault according to one embodiment of the disclosure.

FIG. 9B is a flow chart illustrating a method for tolerating a single local-based processor hardware fault according to one embodiment of the disclosure. At block 932, it is determined whether a new processor is available. If a new processor is available the method may continue with attempting to allocate a new processor at block 906 for performing tasks in the queue assigned to the failed processor. If no new processor is available a course of action may be selected at block 934.

A first course of action for hardware tolerance of a failed cloud processor may include blocks 910 and 912. At block 910, realtime tasks in a queue assigned to the failed processor may be scheduled on a single processor using RAPM or executed using a maximum frequency of the processor. The selection of RAPM or maximum frequency execution may be based, for example, on the workload of the tasks. At block 912, non-realtime tasks may be executed on another processor.

A second course of action for hardware tolerance of a failed cloud processor may include blocks 914 and 916. At block 914, realtime tasks may be scheduled on a first and second processor using EDF and EDL, respectively. At block 916, non-realtime tasks may be scheduled in idle intervals between realtime tasks on the first processor and executed at a threshold frequency. Deadlines for the non-realtime tasks may be assigned to be longer than those of the realtime tasks. In one embodiment, the deadlines may be assigned in an incremental fashion. For example, if deadlines of realtime tasks are bound to reach a maximum value after which the time is reset, the non-realtime tasks may be assigned values above that maximum, such as max+1000 time units for the first non-realtime task, max+1001 for the next non-realtime task, etc. In one embodiment, EDF is implemented as the scheduling algorithm for executing non-realtime tasks, without the use of RR scheduling.

Figure 9C:
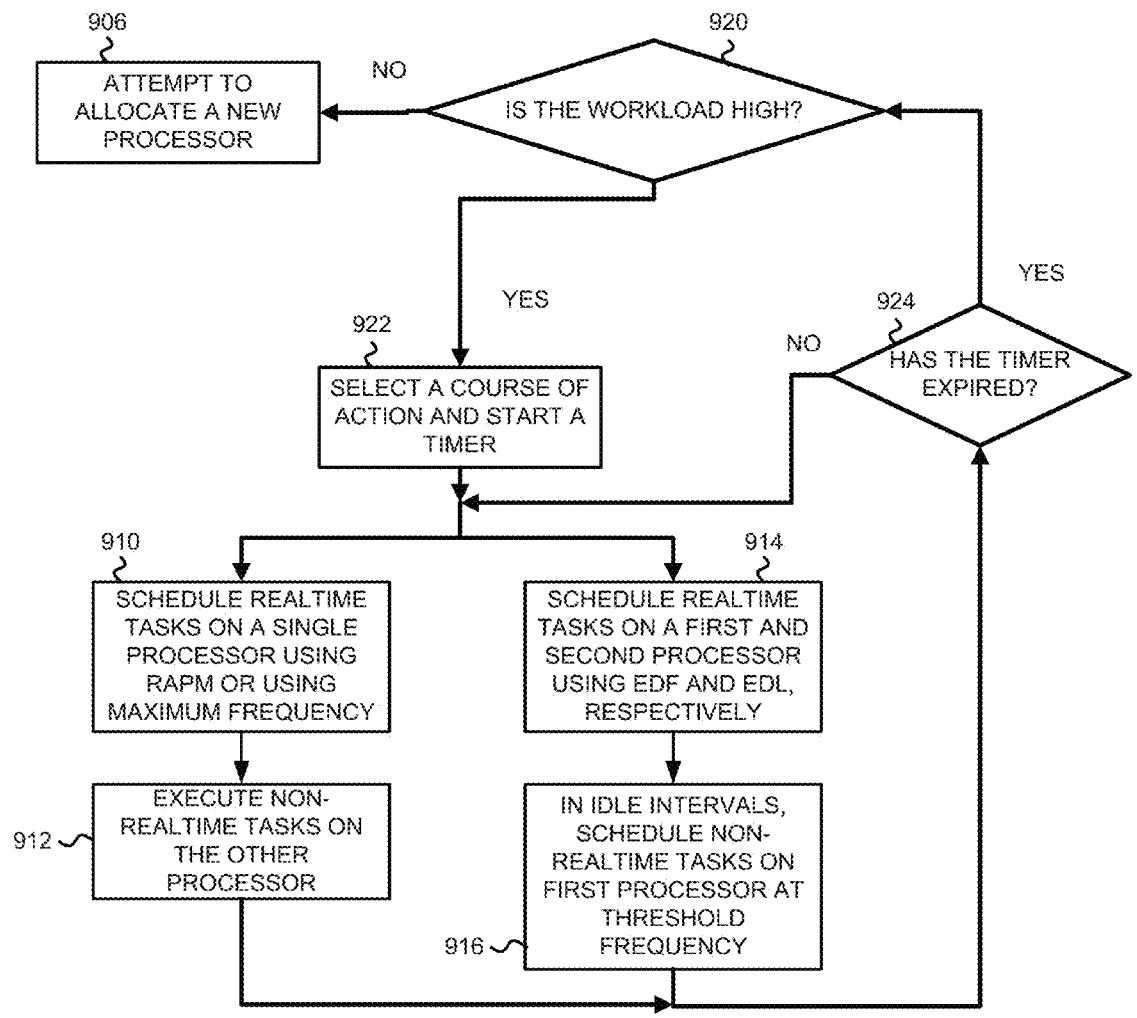
FIG. 9C is a flow chart illustrating a method for tolerating a single cloud-based processor hardware fault according to one embodiment of the disclosure.

A different response for a failed processor may occur when the processor is a local processor. FIG. 9C is a flow chart illustrating a method for tolerating a single cloud-based processor hardware fault according to one embodiment of the disclosure. At block 920 it is determined whether a high workload exists on the remaining processors. If not, then the method may proceed to block 906 to attempt to allocate a new processor. If the workload is too high, then a new processor may not be available. A course of action may be selected and a timer started at block 922. A first course of action may include blocks 910 and 912, as described above with reference to FIG. 9B. A second course of action may include blocks 914 and 916, as described above with reference to FIG. 9B. While the first or second course of action is executing, the timer may be checked at block 924. When the timer expires, the method may return to block 920 to check a workload of the processors. If the timer has not expired then the selected course of action may continue executing.

Figure 9D:
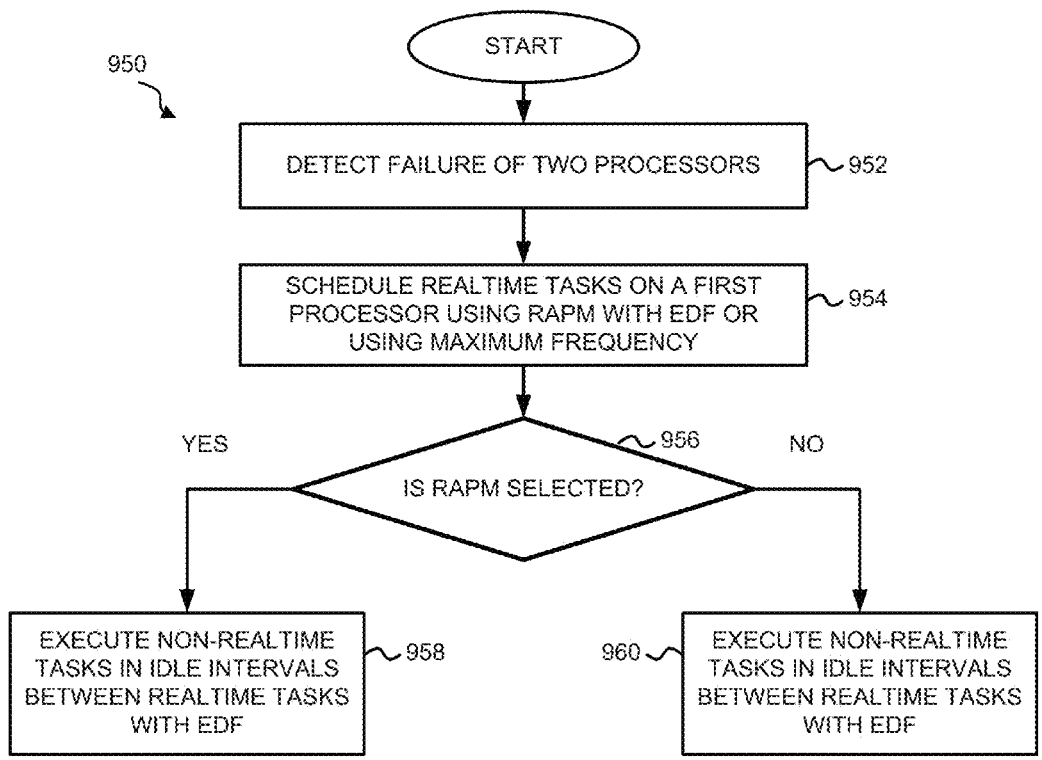
FIG. 9D is a flow chart illustrating a method for tolerating a second processor hardware fault according to one embodiment of the disclosure.

If a second or additional processors fail after the execution of hardware tolerance as described above in FIGS. 9A-C, additional steps may be taken. FIG. 9D is a flow chart illustrating a method for tolerating a second processor hardware fault according to one embodiment of the disclosure. A method 950 begins at block 952 with detecting the failure of a second or additional processors. At block 954, realtime tasks from a queue for the failed processor may be scheduled on a first processor using RAPM with EDF or scheduled for execution at maximum frequency. RAPM or maximum frequency may be selected based on workload or user settings. At block 956, it is determined if RAPM is selected at block 954. If so, the method 900 executes non-realtime tasks in idle intervals between realtime tasks with EDF at block 958. Deadlines may then be assigned to non-realtime tasks to be longer than those of the realtime tasks. In one embodiment, the deadlines may be assigned in an incremental fashion. For example, if deadlines of realtime tasks are bound to reach a maximum value after which the time is reset, the non-realtime tasks may be assigned values above the maximum, such as max+1000 time units for the first non-realtime task, max+1001 for the next non-realtime task, etc. If RAPM is not selected at block 956, the method 900 executes non-realtime tasks in idle intervals between realtime tasks with EDF at block 960. In one embodiment, the deadlines may be assigned in an incremental fashion. For example, if deadlines of realtime tasks are bound to reach a maximum value after which the time is reset, the non-realtime tasks may be assigned values above the maximum, such as max+1000 time units for the first non-realtime task, max+1001 for the next non-realtime task, etc.

Figure 10:
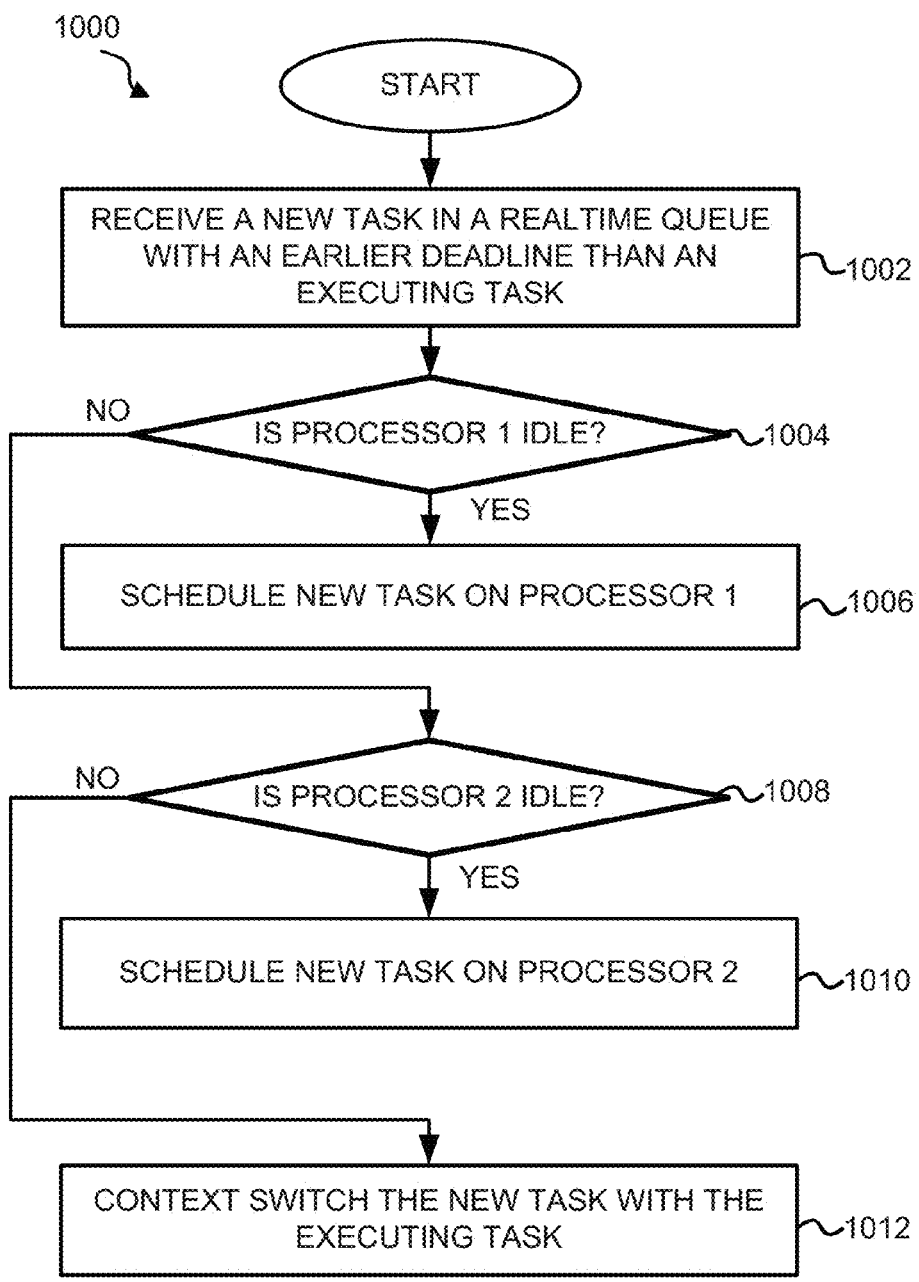
FIG. 10 is a flow chart illustrating a method for scheduling realtime tasks with reduced context switching according to one embodiment of the disclosure.

Generally, and in some embodiments in the scheduling schemes described above, context switching may be reduced to improve power efficiency and to improve the likelihood of all realtime tasks being completed before their respective scheduled deadlines. Context switching may be reduced by identifying idle processors, whether locally-based of cloud-based, and assigning realtime tasks to idle processors. FIG. 10 is a flow chart illustrating a method for scheduling realtime tasks with reduced context switching according to one embodiment of the disclosure. A method 1000 may begin at block 1002 with receiving a new task at a realtime queue with an earlier deadline than an existing executing task. Conventionally, a context switch would be performed to allow execution of the new task. The context switch consumes processor overhead time that reduces power efficiency. Further, by terminating execution of the executing task before completion, the executing task when restarted by the processor may not be completed before its deadline. Rather than context switch the executing task with the new task, the method 1000 attempts to identify an idle processor to perform the new task.

At block 1004, it is determined whether a first processor is idle. If so, then the new task may be scheduled on the first processor at block 1006. If the first processor is not idle, then the method 1000 proceeds to block 1006 to determine if a second processor is idle. If so, the new task may be scheduled on the second processor at block 1010. If the second processor is not idle, then the method 1000 may proceed to block 1012 to context switch the new task with the executing task. Although processor checking for two processors is shown in FIG. 10, the method 1000 may check additional processors, such as a third or fourth processor, to determine if an idle processor is available before context switching at block 1012.

Figure 11:
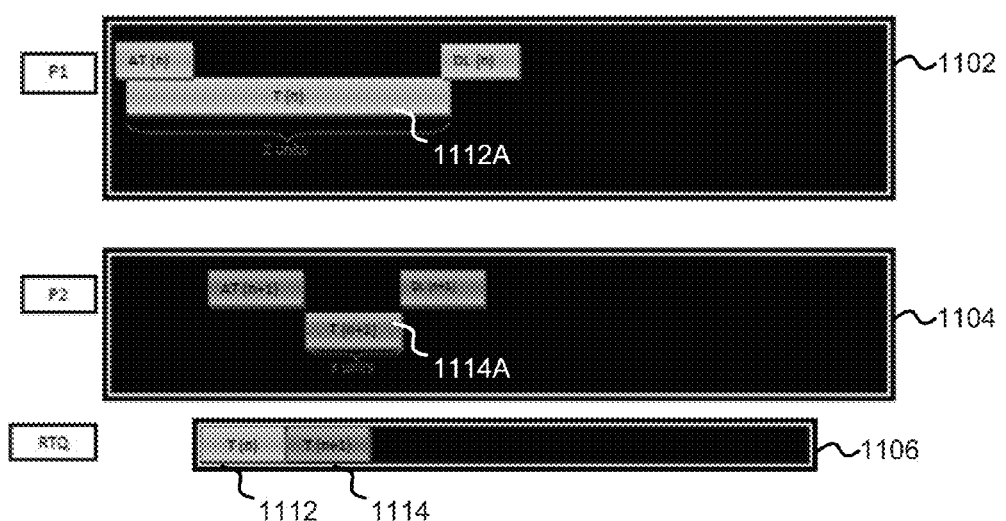
FIG. 11 is a block diagram illustrating the scheduling of realtime tasks with reduced context switching according to one embodiment of the disclosure.

The resulting execution of tasks when the method 1000 of FIG. 10 is executed is illustrated in FIG. 11. FIG. 11 is a block diagram illustrating the scheduling of realtime tasks with reduced context switching according to one embodiment of the disclosure. A first processor 1102 and a second processor 1104 may be executing tasks from a realtime (RT) queue 1106. An existing task 1112 may be executing as task 1112A on the first processor 1102. While task 1112A is executing, a new task 1114 may be queued in the queue 1106. Conventionally, task 1112A would be terminated to allow task 1114 to execute on processor 1102. However, according to the method 1000 of FIG. 10, the first processor 1102 is first checked to determine if processor 1102 is idle. Processor 1102 is not idle, the second processor 1104 is checked to determine if processor 1104 is idle. Processor 1104 is idle, thus new task 1114 is assigned to processor 1104 to be executed as task 1114A. By scheduling task 1114 on an idle processor, task 1112 is allowed to complete without context switching and possibly before the deadline assigned to task 1112. Further, task 1112 is allowed to continue executing without holding task 1114 beyond its deadline. Instead, task 1114 is allowed to execute in parallel with task 1112 by identifying an idle processor.

Figure 12:
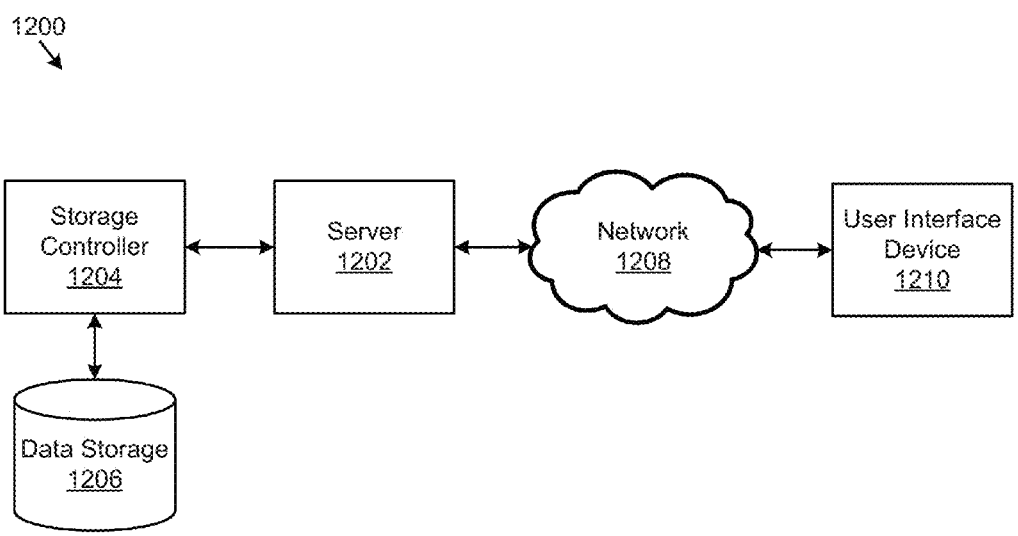
FIG. 12 is a block diagram illustrating a computer network according to one embodiment of the disclosure.

The algorithms for assigning, scheduling, and executing applications and tasks as described above may be executed within a system as shown in FIG. 12. FIG. 12 illustrates one embodiment of a system 1200 for an information system, including a server for a cloud datacenter with multiple processors distributing tasks as described above. The system 1200 may include a server 1202, a data storage device 1206, a network 1208, and a user interface device 1210. In a further embodiment, the system 1200 may include a storage controller 1204, or storage server configured to manage data communications between the data storage device 1206 and the server 1202 or other components in communication with the network 1208. In an alternative embodiment, the storage controller 1004 may be coupled to the network 1208.

In one embodiment, the user interface device 1210 is referred to broadly and is intended to encompass a suitable processor-based device such as a desktop computer, a laptop computer, a personal digital assistant (PDA) or tablet computer, a smartphone, or other mobile communication device having access to the network 1208. In a further embodiment, the user interface device 1210 may access the Internet or other wide area or local area network to access a web application or web service hosted by the server 1202 and may provide a user interface for controlling the information system.

The network 1208 may facilitate communications of data between the server 1202 and the user interface device 1210.

The network 1208 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 13:
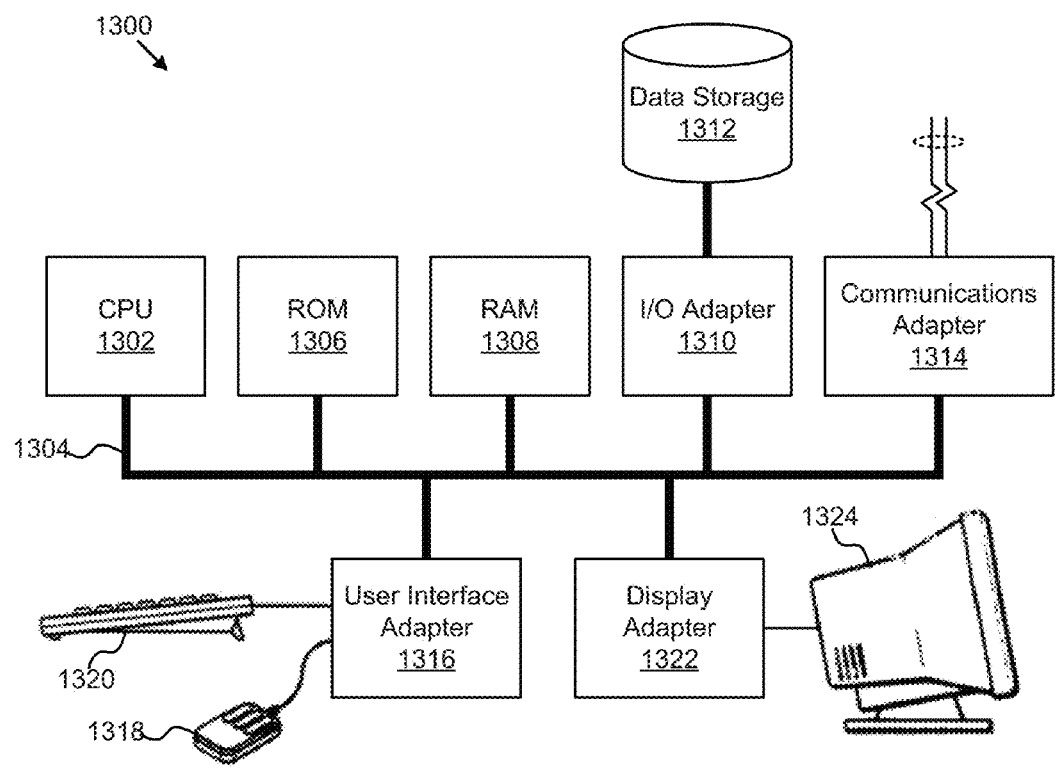
FIG. 13 is a block diagram illustrating a computer system according to one embodiment of the disclosure.

FIG. 13 illustrates a computer system 1300 adapted according to certain embodiments of the server 1202 and/or the user interface device 1210. The central processing unit ("CPU") 1302 is coupled to the system bus 1304. Although only a single CPU is shown, multiple CPUs may be present. The CPU 1302 may be a general purpose CPU or microprocessor, graphics processing unit ("GPU"), and/or microcontroller. The present embodiments are not restricted by the architecture of the CPU 1302 so long as the CPU 1302, whether directly or indirectly, supports the operations as described herein. The CPU 1302 may execute the various logical instructions according to the present embodiments.

The computer system 1300 may also include random access memory (RAM) 1308, which may be synchronous RAM (SRAM), dynamic RAM (DRAM), synchronous dynamic RAM (SDRAM), or the like. The computer system 1300 may utilize RAM 1308 to store the various data structures used by a software application. The computer system 1300 may also include read only memory (ROM) 1306 which may be PROM, EPROM, EEPROM, optical storage, or the like. The ROM may store configuration information for booting the computer system 1300. The RAM 1308 and the ROM 1306 hold user and system data, and both the RAM 1308 and the ROM 1306 may be randomly accessed.

The computer system 1300 may also include an input/output (I/O) adapter 1310, a communications adapter 1314, a user interface adapter 1316, and a display adapter 1322. The I/O adapter 1310 and/or the user interface adapter 1316 may, in certain embodiments, enable a user to interact with the computer system 1300. In a further embodiment, the display adapter 1322 may display a graphical user interface (GUI) associated with a software or web-based application on a display device 1324, such as a monitor or touch screen.

The I/O adapter 1310 may couple one or more storage devices 1312, such as one or more of a hard drive, a solid state storage device, a flash drive, a compact disc (CD) drive, a floppy disk drive, and a tape drive, to the computer system 1300. According to one embodiment, the data storage 1312 may be a separate server coupled to the computer system 1300 through a network connection to the I/O adapter 1310. The communications adapter 1314 may be adapted to couple the computer system 1300 to the network 1208, which may be one or more of a LAN, WAN, and/or the Internet. The user interface adapter 1316 couples user input devices, such as a keyboard 1320, a pointing device 1318, and/or a touch screen (not shown) to the computer system 1300. The keyboard 1320 may be an on-screen keyboard displayed on a touch panel. The display adapter 1322 may be driven by the CPU 1302 to control the display on the display device 1324. Any of the devices 1302-1322 may be physical and/or logical.

The applications of the present disclosure are not limited to the architecture of computer system 1300. Rather the computer system 1300 is provided as an example of one type of computing device that may be adapted to perform the functions of the server 1202 and/or the user interface device 1210. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system may be virtualized for access by multiple users and/or applications.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media. Additionally, the firmware and/or software may be executed by processors integrated with components described above.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
   detecting, by a processor, at least one processor, scheduled to execute portions of a queue of realtime tasks and a queue of non-realtime tasks, has failed of a group of processors spanning at least two platforms coupled by a network;

determining, by the processor, whether the failed processor of the group of processors is local to the processor or whether the failed processor of the group of processors is coupled through a network to the processor; and performing, by the processor, a course of action for performing tasks assigned to the failed process based, at least in part, on whether the failed processor is a local processor or a cloud processor;

detecting, by the processor, that a second processor, scheduled to execute portions of the realtime tasks and non-realtime tasks, has failed of the group of processors;

scheduling, by the processor after detecting the second failed processor, the realtime tasks on a first other processor of the group of processor;

executing the realtime tasks on the first other processor using at least one execution strategy selected from a group comprising using reliability aware power management (RAPM) and using earliest deadline first (EDF) at a maximum frequency of the first other processor, the execution strategy selected based, at least in part, on a workload of the first other processor;

when executing realtime tasks using reliability aware power management (RAPM), executing the non-realtime tasks in idle intervals between executing the realtime tasks;

when executing realtime tasks using earliest deadline first (EDF), executing the non-realtime tasks in idle intervals between executing the realtime tasks.

2. The method of claim 1, further comprising when the failed processor is local to the processor:
determining, by the processor, whether a new processor is available;
when a new processor is available, attempting, by the processor, to allocate tasks assigned to the failed processor to the new processor.

3. The method of claim 2, further comprising, when a new processor is not available:
scheduling the realtime tasks on a first other processor of the group of processors;
executing the realtime tasks on the first other processor using at least one execution strategy selected from a group comprising using reliability aware power management (RAPM) and using a maximum frequency of the first other processor, the execution strategy selected based, at least in part, on a workload of the first other processor; and
scheduling non-realtime tasks on a second other processor of the group of processors.

4. The method of claim 2, further comprising, when a new processor is not available:
scheduling realtime tasks on a first other processor and a second other processor of the group of processors;
executing the realtime tasks on the first other processor using earliest deadline first (EDF);
executing the realtime tasks on the second other processor using earliest deadline last (EDL); and
scheduling non-realtime tasks on the first other processor.

5. The method of claim 2, further comprising:
assigning deadlines to the non-realtime tasks to be greater than deadlines for the realtime tasks, wherein the assigned deadline is greater than a maximum value for which a time is reset for the realtime tasks; and
executing the non-realtime tasks using earliest deadline first (EDF).

6. The method of claim 1, further comprising assigning deadlines to the non-realtime tasks to be greater than deadlines for the realtime tasks, wherein the assigned deadline is greater than a maximum value for which a time is reset for the realtime tasks.

7. The method of claim 1, further comprising when the failed processor is a cloud processor:
determining whether a workload of the group of processors exceeds a threshold level; and when the workload is below the threshold level, attempting to allocate tasks assigned to the failed processor to a new processor.

8. The method of claim 7, further comprising, when the workload is above the threshold level, starting a timer and selecting and performing a first course of action or a second course of action, wherein the first course of action comprises:
scheduling the realtime tasks on a first other processor of the group of processors;
executing the realtime tasks on the first other processor using at least one execution strategy selected from a group comprising using reliability aware power management (RAPM) and using a maximum frequency of the first other processor, the execution strategy selected based, at least in part, on a workload of the first other processor; and
scheduling non-realtime tasks on a second other processor of the group of processors, and
wherein the second course of action comprises:
scheduling realtime tasks on a first other processor and a second other processor of the group of processors;
executing the realtime tasks on the first other processor using earliest deadline first (EDF);
executing the realtime tasks on the second other processor using earliest deadline last (EDL); and
scheduling non-realtime tasks on the first other processor during idle intervals, and
wherein the selected course of action is repeated until the timer expires.

9. A computer program product, comprising:
a non-transitory computer readable medium comprising code to perform the steps comprising:
detecting at least one processor, scheduled to execute portions of a queue of realtime tasks and a queue of non-realtime tasks, has failed of a group of processors spanning at least two platforms coupled by a network;
determining whether the failed processor of the group of processors is local to the processor or whether the failed processor of the group of processors is coupled through a network to the processor;
performing a course of action for performing tasks assigned to the failed process based, at least in part, on whether the failed processor is a local processor or a cloud processor;
detecting, by the processor, that a second processor, scheduled to execute portions of the realtime tasks and non-realtime tasks, has failed of the group of processors;
scheduling, by the processor after detecting the second failed processor, the realtime tasks on a first other processor of the group of processor;
executing the realtime tasks on the first other processor using at least one execution strategy selected from a group comprising using reliability aware power management (RAPM) and using earliest deadline first (EDF) at a maximum frequency of the first other processor, the execution strategy selected based, at least in part, on a workload of the first other processor;

when executing realtime tasks using reliability aware power management (RAPM), executing the non-realtime tasks in idle intervals between executing the realtime tasks;

when executing realtime tasks using earliest deadline first (EDF), executing the non-realtime tasks in idle intervals between executing the realtime tasks.

10. The computer program product of claim 9, wherein the medium further comprises code to perform the step of, when the failed processor is local to the processor:
   determining, by the processor, whether a new processor is available;
   when a new processor is available, attempting, by the processor, to allocate tasks assigned to the failed processor to the new processor.

11. The computer program product of claim 10, wherein the medium further comprises code to perform the steps of, when a new processor is not available:
   scheduling the realtime tasks on a first other processor of the group of processors;
   executing the realtime tasks on the first other processor using at least one execution strategy selected from a group comprising using reliability aware power management (RAPM) and using a maximum frequency of the first other processor, the execution strategy selected based, at least in part, on a workload of the first other processor; and
   scheduling non-realtime tasks on a second other processor of the group of processors.

12. The computer program product of claim 10, wherein the medium further comprises code to perform the steps of, when a new processor is not available:
   scheduling realtime tasks on a first other processor and a second other processor of the group of processors;
   executing the realtime tasks on the first other processor using earliest deadline first (EDF);
   executing the realtime tasks on the second other processor using earliest deadline last (EDL); and scheduling non-realtime tasks on the first other processor during idle intervals.

13. The computer program product of claim 10, wherein the medium further comprises code to perform the steps of:
   assigning deadlines to the non-realtime tasks to be greater than deadlines for the realtime tasks, wherein the assigned deadline is greater than a maximum value for which a time is reset for the realtime tasks; and
   executing the non-realtime tasks using earliest deadline first (EDF).

14. The computer program product of claim 9, wherein the medium further comprises code to perform the step of assigning deadlines to the non-realtime tasks to be greater than deadlines for the realtime tasks, wherein the assigned deadline is greater than a maximum value for which a time is reset for the realtime tasks.

15. The computer program product of claim 9, wherein the medium further comprises code to, when the failed processor is a cloud processor, perform the steps of:
   determining whether a workload of the group of processors exceeds a threshold level; and
   when the workload is below the threshold level, attempting to allocate tasks assigned to the failed processor to a new processor.

16. The computer program product of claim 15, wherein the medium further comprises code to,
   when the workload is above the threshold level, perform the steps of starting a timer and selecting and performing a first course of action or a second course of action, wherein the first course of action comprises:
      scheduling the realtime tasks on a first other processor of the group of processors;
      executing the realtime tasks on the first other processor using at least one execution strategy selected from a group comprising using reliability aware power management (RAPM) and using a maximum frequency of the first other processor, the execution strategy selected based, at least in part, on a workload of the first other processor; and
      scheduling non-realtime tasks on a second other processor of the group of processors, and wherein the second course of action comprises:
      scheduling realtime tasks on a first other processor and a second other processor of the group of processors;
      executing the realtime tasks on the first other processor using earliest deadline first (EDF);
      executing the realtime tasks on the second other processor using earliest deadline last (EDL); and
      scheduling non-realtime tasks on the first other processor during idle intervals, and
   wherein the selected course of action is repeated until the timer expires.

17. An apparatus, comprising:
a memory; and
a processor coupled to the memory, wherein the processor is configured to perform the steps comprising:
   detecting, by the processor, at least one processor, scheduled to execute portions of a queue of realtime tasks and a queue of non-realtime tasks, has failed of a group of processors spanning at least two platforms coupled by a network;
   determining, by the processor, whether the failed processor of the group of processors is local to the processor or whether the failed processor of the group of processors is coupled through a network to the processor; and
   performing, by the processor, a course of action for performing tasks assigned to the failed process based, at least in part, on whether the failed processor is a local processor or a cloud processor;
   detecting, by the processor, that a second processor, scheduled to execute portions of the realtime tasks and non-realtime tasks, has failed of the group of processors;
   scheduling, by the processor after detecting the second failed processor, the realtime tasks on a first other processor of the group of processor;
   executing the realtime tasks on the first other processor using at least one execution strategy selected from a group comprising using reliability aware power management (RAPM) and using earliest deadline first (EDF) at a maximum frequency of the first other processor, the execution strategy selected based, at least in part, on a workload of the first other processor;
   when executing realtime tasks using reliability aware power management (RAPM), executing the non-realtime tasks in idle intervals between executing the realtime tasks;
   when executing realtime tasks using earliest deadline first (EDF), executing the non-realtime tasks in idle intervals between executing the realtime tasks.

18. The apparatus of claim 17, wherein the processor is further configured to perform the steps of, when the failed processor is local to the processor:
- determining, by the processor, whether a new processor is available;
- when a new processor is available, attempting, by the processor, to allocate tasks assigned to the failed processor to the new processor.

19. The apparatus of claim 18, wherein the processor is further configured to perform, when a new processor is not available, the steps of:
- scheduling the realtime tasks on a first other processor of the group of processors;
- executing the realtime tasks on the first other processor using at least one execution strategy selected from a group comprising using reliability aware power management (RAPM) and using a maximum frequency of the first other processor, the execution strategy selected based, at least in part, on a workload of the first other processor; and
- scheduling non-realtime tasks on a second other processor of the group of processors.

20. The apparatus of claim 18, wherein the processor is further configured to perform, when a new processor is not available, the steps of:
- scheduling realtime tasks on a first other processor and a second other processor of the group of processors;
- executing the realtime tasks on the first other processor using earliest deadline first (EDF);
- executing the realtime tasks on the second other processor using earliest deadline last (EDL); and
- scheduling non-realtime tasks on the first other processor during idle intervals.

21. The apparatus of claim 18, wherein the processor is further configured to execute the steps of:
- assigning deadlines to the non-realtime tasks to be greater than deadlines for the realtime tasks, wherein the assigned deadline is greater than a maximum value for which a time is reset for the realtime tasks; and
- executing the non-realtime tasks using earliest deadline first (EDF).

22. The apparatus of claim 17, wherein the processor is further configured to execute the step of assigning deadlines to the non-realtime tasks to be greater than deadlines for the realtime tasks, wherein the assigned deadline is greater than a maximum value for which a time is reset for the realtime tasks.

23. The apparatus of claim 17, wherein the processor is further configured to, when the failed processor is a cloud processor, perform the steps of:
- determining whether a workload of the group of processors exceeds a threshold level; and
- when the workload is below the threshold level, attempting to allocate tasks assigned to the failed processor to a new processor.

24. The apparatus of claim 23, wherein the processor is further configured to,
- when the workload is above the threshold level, perform the steps of starting a timer and selecting and performing a first course of action or a second course of action,
- wherein the first course of action comprises:
  - scheduling the realtime tasks on a first other processor of the group of processors;
  - executing the realtime tasks on the first other processor using at least one execution strategy selected from a group comprising using reliability aware power management (RAPM) and using a maximum frequency of the first other processor, the execution strategy selected based, at least in part, on a workload of the first other processor; and
  - scheduling non-realtime tasks on a second other processor of the group of processors, and
- wherein the second course of action comprises:
  - scheduling realtime tasks on a first other processor and a second other processor of the group of processors;
  - executing the realtime tasks on the first other processor using earliest deadline first (EDF);
  - executing the realtime tasks on the second other processor using earliest deadline last (EDL); and
  - scheduling non-realtime tasks on the first other processor during idle intervals, and
- wherein the selected course of action is repeated until the timer expires.

* * * * *